United States Patent Office 2,998,223
Patented Aug. 29, 1961

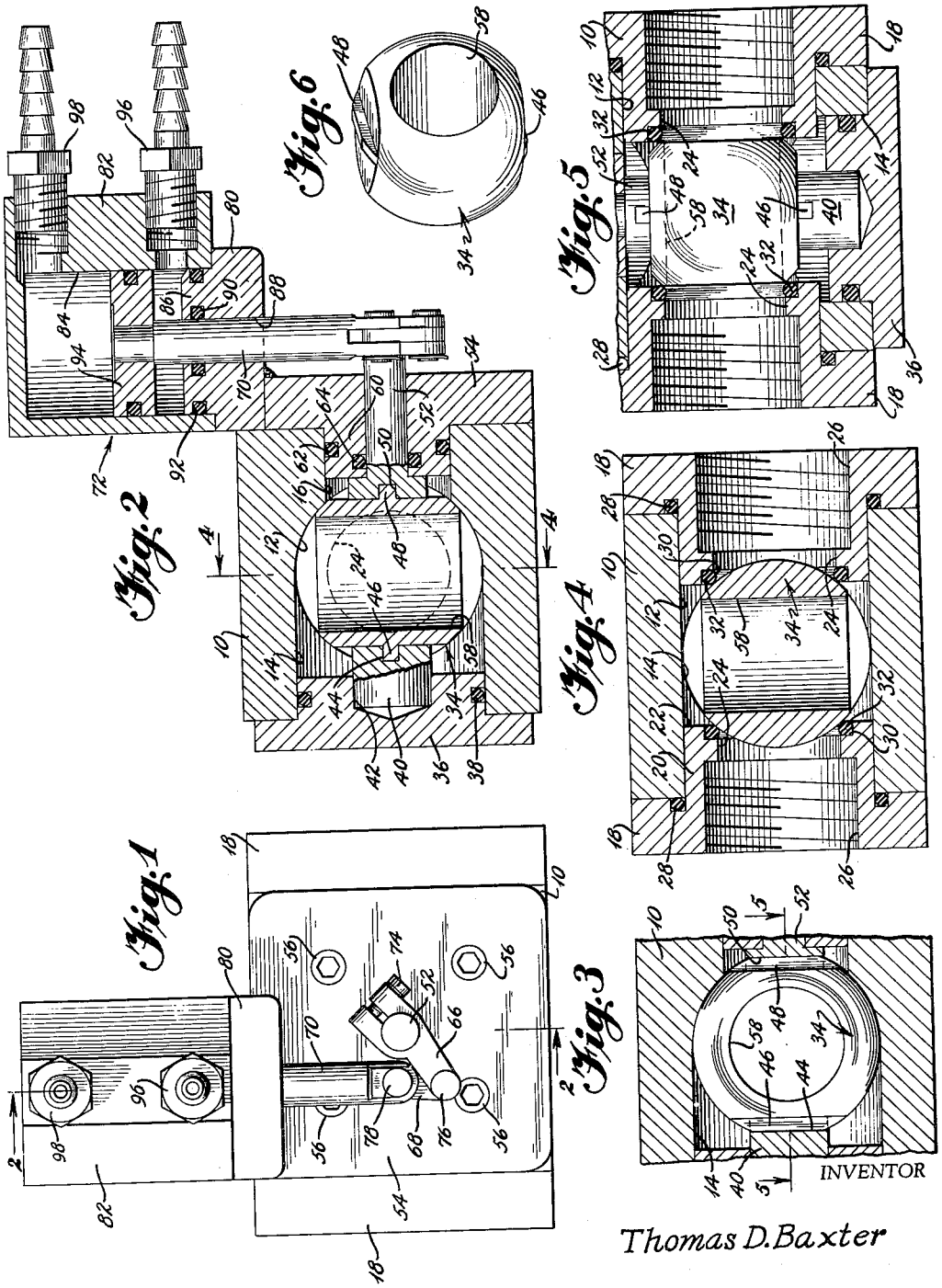

2,998,223
VALVE ASSEMBLY
Thomas Donnelly Baxter, East Petersburg, Pa., assignor to Baxter Filtration Corporation, Lancaster, Pa., a corporation of Pennsylvania
Filed Nov. 20, 1958, Ser. No. 775,269
1 Claim. (Cl. 251—309)

This invention relates to valve assemblies, and more particularly to an improved ball valve assembly construction.

Ball or spherical valves of the type of which the present invention is concerned, because of the spherical shape of the valve member, present certain difficulties from the manufacturing standpoint. Since the diameter of the ball must be larger than the diameter of the passage which it is to seal, the valve housing is usually constructed in two separable parts. Aside from machining and casting problems presented by the prior art structures, the two-part housing requires the valve to be removed from the flow line in which it is used for repair of the valve member or replacement of seals in the flow passage.

One object of the invention is to provide a ball valve structure in which the ball and flow passage seals may be replaced without disconnecting the valve from its flow line.

Another object of the invention is to provide a ball valve which may be readily constructed with simple machining operations.

Still another object of the invention is to provide a ball valve assembly through which fluid may flow in either direction and which is self-sealing in either direction of the flow.

Still another object of my invention is to provide a ball valve and actuator assembly wherein the actuator may be readily oriented in any of a plurality of positions.

Other objects and advantages of the invention will become apparent by reference to the following specification taken in conjunction with the accompanying drawings.

In the drawings:

FIG. 1 is a plan view of a valve embodying the present invention;

FIG. 2 is a cross-sectional view through the valve of FIG. 1 taken on the line 2—2 of FIG. 1;

FIG. 3 is a partial cross-sectional view of the valve of FIG. 1 similar to FIG. 2 but showing the valve member in another position;

FIG. 4 is a cross-sectional view of the valve taken approximately on the line 4—4 of FIG. 2;

FIG. 5 is a partial cross-sectional view of the valve taken on the line 5—5 of FIG. 3; and FIG. 6 is a perspective view of the spherical valve member.

As shown in the drawings, the valve assembly includes a cubical block like housing 10. A first bore 12 extends entirely through housing 10 and is intersected at right angles by a second bore 14 having a diameter, as best seen in FIG. 2, equal to the diameter of the first bore 12. A third bore 16 of somewhat smaller diameter intersects bore 12 opposite the intersection of bore 14 with bore 12, bore 16 being coaxial with bore 14.

A pair of like coupling members 18 are fixedly secured to housing 10 at each end of bore 12. As best seen in FIG. 4, each of coupling members 18 is identical, and includes a projection 20 which extends into bore 12 to terminate at a flat face 22 which lies in a plane perpendicular to the axis of bore 12. A flow passage 24 extends through each coupling member 18 coaxial with bore 12. The outer portions of flow passage 24 are enlarged and internally threaded as at 26 to form a coupling for inlet and outlet conduits. As will become apparent, the direction of flow of fluid through the valve is not important, either flow passage 24 may function as an inlet or an outlet. Coupling members 18 are each provided with an O-ring type seal 28 and are fixedly secured to the respective faces of housing 10 as by bolts, not shown. The inner end of each flow passage 24 is grooved as at 30 to form a seat for an O-ring 32 which sealingly engages the outer surface of a spherical valve member 34.

As best seen in FIG. 2, the open end of bore 14 is closed by a plug member 36 which is secured in the FIG. 2 position by bolts, not shown. An O-ring 38 is mounted upon the portion of plug 36 which projects into bore 14 to seal the bore. A trunnion 40 is mounted for rotation within a central bore 42 in plug member 36, the axis of rotation of trunnion 40 coinciding with the axis of bore 14. The inner end of trunnion 40 is slotted as at 44 to slideably engage a key 46 formed by cutting away the surface of ball 34. At the diametrically opposed side of ball 34, a similar key 48 is formed in the same manner to extend parallel to key 46. Key 48 is slideably received in a slot 50 cut in the inner end of a second trunnion 52 which is journaled for rotation within a frame member 54 secured as by bolts 56 to the side of housing 10 opposite the side in which bore 14 is formed. The axis of rotation of trunnions 40 and 52 is a common axis which is coaxial with bore 14. As best appreciated from FIGS. 2 and 3 ball 34 is formed with a diametric flow passage 58 which extends through ball 34 in a direction perpendicular to the axis of rotation of the ball which is defined in turn by trunnions 40 and 52.

Frame member 54 includes a projection 60 which is seated within bore 16 and sealed to the side of the bore as by an O-ring 62. A second O-ring 64 forms a seal between trunnion 52 and the bore in which it is seated. Trunnion 52 is coupled by means of a crank 66 and link 68 to the piston rod 70 of a fluid pressure operated motor 72. Crank 66 is coupled to trunnion 50 as by a clamp connection 74 and is coupled to link 68 by a pivot pin 76. Link 68 is coupled to piston rod 70 by a second pivot pin 78 in a manner such that link 68 may compensate for the straight line movement of piston rod 70 and the circular path required of the end of crank 66.

Fluid pressure actuated motor 72 includes an end plate 80 which is fixedly secured to frame member 54 as by welding at W. A motor block 82 is constructed with a chamber defining bore 84 which is received upon a complementary projection 86 on plate 80. Piston rod 70 is slideably received within a bore 88 extending through plate 80. O-ring seals 90 and 92 respectively seal plate 80 to piston rod 70 and to motor block 82. Motor block 82 is clamped to plate 80 as by screws, not shown. A piston 94 is secured to the inner end of piston rod 70 to reciprocate within the chamber of motor block 82. Couplings 96 and 98 are received within passages extending through motor block 82 to communicate with the chamber within the block at the rod end and head end of the motor.

As best seen in FIG. 1, frame member 54 is mounted upon housing block 10 by four bolts 56 which are equidistant from the axis of trunnion 52. Because of this mounting arrangement, frame member 54 may be secured upon block 10 to locate motor block 82 in any one of four possible positions.

It is believed apparent that by suitable actuation of pressure operated motor 72, trunnion 52 may be driven in rotation through an angle of 90°. This rotation is employed to drive the valve between the blocking position shown in FIGS. 2 and 4 and the open position shown in FIGS. 3 and 5. When in the open position, as best seen in FIG. 5, the axis of diametric passage 58 is coaxial with the aligned axes of flow passages 24 to permit fluid to flow through the valve from one of the passages 24 to the other. When the piston is actuated to its opposite limit of movement, the axis of diametric passage 58 is rotated 90° into the position shown in FIG. 4. In this position, communication between the respective flow passages 24 is blocked by virtue of the sealing engagement between ball 34 and O-rings 32.

It will be noted that the valve is self-sealing in either direction—that is assuming the left-hand passage 24 of FIG. 4 to be the inlet, pressure applied to the left-hand side of ball 34 drives it against the opposite or right-hand O-ring 32, thereby sealing the right-hand flow passage 24. Because the key and slot interconnection between ball 34 and trunnions 40 and 52 extends in a direction at right angles to the flow passage 58, the ball when in its blocking position may partake of a slight movement axially of flow passages 24 to permit the aforementioned sealing action.

It will be noted that because of the substantial equality in diameters between bores 12 and 14 and ball 34, ball 34 may be removed from housing 10 merely by removing plug 36. To remove the ball from the valve, it is necessary that the ball be in the position shown in FIG. 5—in other words the valve must be in its open position. While this requires that flow of fluid through the conduit within which the valve is connected be shut-off, it does not require that the valve be removed from the conduit, since the valve is connected in the conduit by coupling members 18. Upon removal of the ball 34 in the foregoing fashion, seals 32 may be easily replaced.

While I have described but one embodiment of my invention, it will be apparent to those skilled in the art that the disclosed embodiment may be modified. Therefore, the foregoing description is to be considered exemplary rather than limiting, and the true scope of my invention is that defined in the following claim.

I claim:

A ball valve assembly comprising a block-like housing having a first bore extending centrally therethrough and a second bore extending through said housing to intersect said first bore at right angles, a spherical valve member located in said housing at the intersection of said bores, plug means in said first bore defining coaxial flow passages extending inwardly from opposite ends of said first bore to terminate at annular seals respectively engaged with opposed sides of said valve member, said valve member having a central diametral passage therethrough having an axis lying in a plane which is normal to the axis of said second bore and which contains the axis of said first bore, a first plug member closing one end of said second bore, said one end of said second bore having an internal diameter at least equal to the diameter of said valve member to permit the insertion and withdrawal of said valve member into and out of said first bore through said one end of said second bore, means on said first plug member supporting said valve member for rotation about the axis of said second bore, a second plug member closing the other end of said second bore, an actuating shaft extending through said second plug member and supported therein for rotation about the axis of said second bore, and means coupling said valve member to said shaft for rotation therewith between a first position wherein said diametral passage of said valve member is coaxially aligned with said flow passages in said first bore and a second position wherein said valve member blocks communication between said flow passages.

References Cited in the file of this patent

UNITED STATES PATENTS

| | | |
|---|---|---|
| Re. 19,703 | Goldberg | Sept. 17, 1935 |
| 117,704 | Warren | Aug. 1, 1871 |
| 1,616,386 | O'Stroske | Feb. 1, 1927 |
| 1,784,381 | O'Stroske | Dec. 9, 1930 |
| 2,373,628 | Gleeson | Apr. 10, 1945 |
| 2,858,098 | Sanctuary | Oct. 28, 1958 |
| 2,861,773 | Clade | Nov. 25, 1958 |

FOREIGN PATENTS

| | | |
|---|---|---|
| 873,641 | Germany | Apr. 16, 1953 |